Feb. 9, 1932. J. HAMMERL 1,844,548
MOTOR VEHICLE
Filed Aug. 27, 1930

Inventor
JACOB HAMMERL
By
Attorney

Patented Feb. 9, 1932

1,844,548

UNITED STATES PATENT OFFICE

JACOB HAMMERL, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed August 27, 1930. Serial No. 478,080.

My invention relates to motor vehicles and has particular relation to a removable roof structure for such vehicles.

An object of my invention is to facilitate the manufacture of motor vehicle body structures.

Another object of my invention is to increase the strength of such structures, particularly the roof construction.

Another object of my invention is to provide for ready assembly and disassembly of the roof structure.

Still another object of my invention is to provide a desirable waterproof joint for joining portions of a motor vehicle top.

Another object of my invention is to provide a radio aerial and lead-in for a motor vehicle.

Another object of my invention is to provide means for ready installation and repair of a radio aerial and lead-in.

Still further objects of my invention will appear from the following description taken in connection with the drawings which form a part of this specification and in which.

Figure 1:
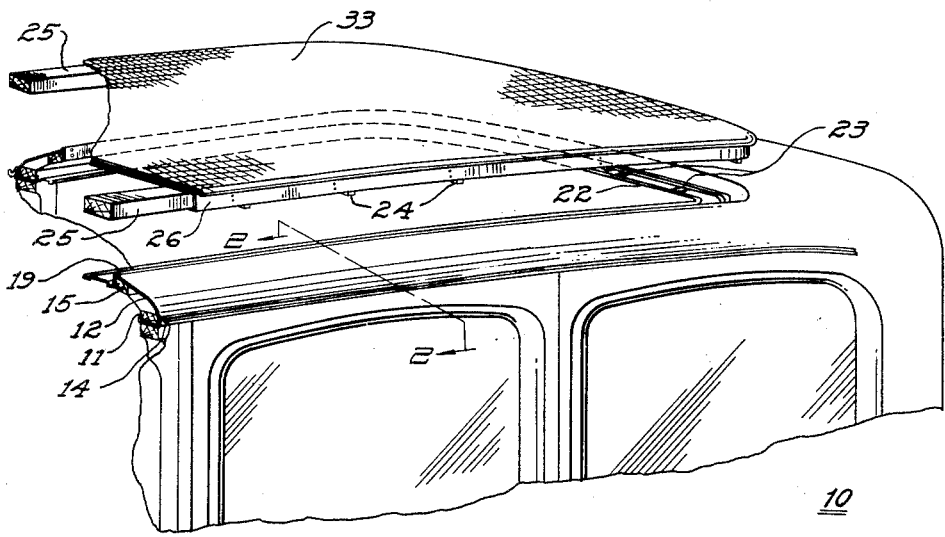
Figure 1 is a view, in perspective, of a fragmentary portion of a motor vehicle body constructed according to my invention and having the top partly removed for better illustration.
Figure 2:
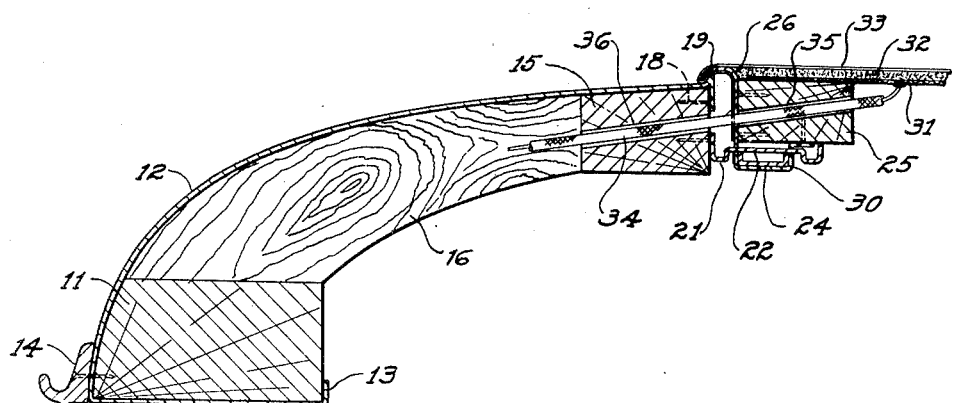
Fig. 2 is a sectional view taken along the line 2—2 of Fig. 1.
Figure 3:
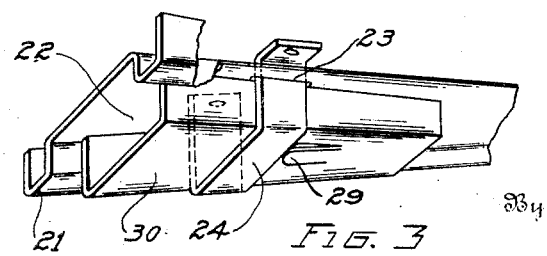
Fig. 3 is a view in perspective of a wedge which may be used in fastening the removable portion of the top.

Referring to the drawings in which like figures indicate like parts, an automobile body 10, built according to my preferred construction, utilizes the usual headers 11 extending longitudinally of the top just above the windows and doors. A sheath 12, preferably of metal, constitutes an outside covering for the side of the top, and this metal sheath extends over the outside of the header bar and beneath it to the inside of the body where it is turned up to provide a flange 13 for securing it to the header bar. A drip moulding 14 is fastened to the header in the usual manner.

I preferably utilize a stationary framework 15 spaced from the header bar and within the outline of the top for supporting the removable portion of the roof. This frame member may be supported in the usual manner by means of ribs 16. The sheath 12 preferably extends over the top of the stationary frame member 15 and is fastened to its inside wall as by means of nails 18 or the like. The sheath is preferably turned up at the inner and upper edge of the frame member 15 to constitute a flange or raised portion 19 for a purpose to be hereinafter explained. A U-shaped molding 21 is fastened to the lower, inner wall of the stationary frame member 15 and extends horizontally inward to constitute a ledge 22 to which the movable portion of the top may be fastened. This ledge is provided with openings 23 for the reception of staple members 24 fastened to the movable frame work.

The removable portion of the top preferably employs other frame members 25 which may be termed the movable frame members for outlining the shape of the top. The outer side of the movable frame member 25 is preferably provided with an inverted L-shaped channel 26 adapted to hook over the flange 19 of the sheath 12 to constitute a weatherproof joint therewith, and U-shaped staple members 24 are preferably fastened to the outside wall and the lower wall of the movable frame member 25 to furnish a locking means for locking the roof in place. The staples are located at suitable intervals along the underside of the movable frame member and extend through the openings 23 in the horizontal portion 22 of the molding 21 which is fastened to the stationary frame member 15.

The channel of the removable portion of the top is then drawn down into close contact with the flange on the stationary frame work to constitute a water-proof joint by means of wedges 30 driven between the inner side of the staples and the under side of the horizontal ledge 22 of the molding 21. If desired, the wedges may be provided with one or more resilient tongues 29 for holding them in place, the tongues being adapted to spring outwardly against the staples when the wedges are driven into place.

The described fastening device or any other suitable fastening means, as, for instance, a toggle fastener, or the like, may be employed for locking the top in place on the roof and in this manner a top structure may be provided which can be removed in fair weather and readily replaced in inclement weather.

The covering for the removable portion of the top is constructed by fastening a wire netting 31 to the movable frame, placing wadding material 32 over the netting and cementing or otherwise fastening a top fabric 33 over the wadding. The top fabric preferably extends over the L-shaped channel 26 and is fastened to the outer wall of the movable frame work.

The netting 31 need not extend to the L-shaped channel 26 and preferably is disposed so that it does not come into contact with any of the metal parts of the roof structure. The netting arranged in this manner constitutes an excellent radio aerial, as it is well insulated by means of the movable frame work 25 and the wadding 32, which are kept dry at all times by means of the cover fabric 33. The lead-in 34, for the radio set, may be attached to the netting at any convenient place, as indicated, and the lead-in brought down to the radio set through registered openings 35 and 36 in the movable frame 25 and the stationary frame 15 respectively.

It is quite evident that with my construction the manufacture and assembly of the roof structure is greatly facilitated since the removable portion of the top may be built on a bench rather than assembled as a part of the top structure. It is apparent that the roof may be readily fastened to and removed from the body. The joints between the movable and stationary portions of the roof are watertight and this construction constitutes a desirable means for fastening the removable portion of a roof to a stationary portion, such as, for example, the landau type of body or in fastening the glass roof of a sightseeing car.

Although I have described a specific embodiment of my invention, it is apparent that modifications may be made by those skilled in the art. Such modifications may be made without departing from the spirit and scope of my invention as set forth in the appended claims.

Having thus described the various features of my invention, what I claim as new and desire to secure by Letters Patent is:

1. A top structure for motor vehicles comprising top frame members arranged to provide an opening in the top, a sheath for the top having an upturned inner edge, a molding projecting inwardly from the lower portion of the top frame members at their inner sides, a roof framework provided with an outwardly projecting flange to engage the upturned inner edge of the sheath and fastening means including removable wedges at the lower portion of the roof frame engaging the inwardly projecting molding to clamp the roof flange tightly against the sheath flange.

2. A joint for automobile body structures comprising a stationary frame work and a movable frame work, a sheath on the upper side of the stationary frame work terminating at an edge thereof in a raised portion, a formed molding attached to the stationary frame work and extending horizontally beneath the movable frame work and having spaced openings in the horizontal portion thereof, a channel at the upper edge of the movable frame work to engage the raised portion of the sheath of the stationary frame work, U-shaped members fastened to the underside of the movable frame work adapted to pass through the openings in the molding and wedges engaged in the U-shaped members to draw the movable portion of the framework into close contact with the stationary part of the framework.

3. In a top structure for motor vehicles, top frame members providing an opening, a sheath for the top frame having an upturned edge around the opening, a molding projecting into the opening from the frame members, a removable roof framework provided with an outwardly projecting flange to engage over the upturned inner edge of the sheath, staple members depending from the roof framework and projecting through the molding, and wedge members intermediate the molding and the portion of the staples projecting through the molding to clamp the roof flange against the upstanding sheath flange.

4. In a top structure for motor vehicles, top frame members providing an opening, a sheath for the top frame having an upturned edge around the opening, a molding projecting into the opening from the frame members, a removable roof framework provided with an outwardly projecting flange to engage over the upturned inner edge of the sheath, staple members depending from the roof framework and projecting through the molding, wedge members intermediate the molding and the portion of the staples projecting through the molding to clamp the roof flange against the upstanding sheath flange, and resilient tongues on the wedge members engaging the staples to maintain the wedge members in fastening position.

In testimony whereof I affix my signature.

JACOB HAMMERL.